United States Patent
Mandeville-Clarke et al.

(10) Patent No.: US 9,716,565 B2
(45) Date of Patent: Jul. 25, 2017

(54) SYSTEM, APPARATUS, AND METHOD FOR GENERATING AND TRANSMITTING AN INTERRUPTION SIGNAL TO A SUBSTANTIALLY AUTONOMOUS VEHICLE

(71) Applicants: Ben Mandeville-Clarke, Tinbeerwah (AU); Danum Anthony Harris-Lusk, Tewantin (AU)

(72) Inventors: Ben Mandeville-Clarke, Tinbeerwah (AU); Danum Anthony Harris-Lusk, Tewantin (AU)

( * ) Notice: Subject to any disclaimer, the term of this patent is extended or adjusted under 35 U.S.C. 154(b) by 0 days.

(21) Appl. No.: 15/268,631

(22) Filed: Sep. 18, 2016

(65) Prior Publication Data
US 2017/0141873 A1    May 18, 2017

(30) Foreign Application Priority Data
Nov. 12, 2015   (AU) .................. 2015904684

(51) Int. Cl.
| | |
|---|---|
| *H04K 3/00* | (2006.01) |
| *H04L 29/08* | (2006.01) |
| *H04W 4/00* | (2009.01) |
| *G08G 1/00* | (2006.01) |

(52) U.S. Cl.
CPC ................. *H04K 3/90* (2013.01); *H04K 3/86* (2013.01); *H04L 67/12* (2013.01); *H04W 4/008* (2013.01); *G08G 1/202* (2013.01)

(58) Field of Classification Search
CPC .. G08G 1/202; G08G 1/164; G08G 1/096708; G08G 1/09675; G08G 1/0968
USPC ....... 455/1, 41.1–41.3, 418–420, 422.1, 403, 455/445, 500, 517, 456.1–457, 412.1, 455/412.2, 414.1–414.4, 575.1, 575.9; 701/23, 25
See application file for complete search history.

(56) References Cited

U.S. PATENT DOCUMENTS

2016/0161266 A1* 6/2016 Crawford ............... G01C 21/34
                                                                 701/25

* cited by examiner

*Primary Examiner* — Keith Ferguson (57) ABSTRACT

Novel apparatus and methods for generating and transmitting an interruption signal to a request for a substantially autonomous vehicle taxi-service based on user-supplied input are presented. The disclosure provides an efficient technique for interrupting an initial request for a substantially autonomous vehicle taxi-service and in some embodiments, further enables for the rescheduling of the request for a substantially autonomous vehicle taxi-service to a future point in time based upon user supplied input.

4 Claims, 2 Drawing Sheets

SYSTEM, APPARATUS, AND METHOD FOR GENERATING AND TRANSMITTING AN INTERRUPTION SIGNAL TO A SUBSTANTIALLY AUTONOMOUS VEHICLE

US PATENT PRIOR ART REFERENCES

U.S. Pat. No. 5,170,352 A December 1992 McTamaney et al.
U.S. Pat. No. 6,038,501 A March 2000 Kawakami
U.S. Pat. No. 6,142,252 A November 2000 Kinto et al.
U.S. Pat. No. 6,799,100 B2 September 2004 Burns et al.
U.S. Pat. No. 6,813,561 B2 November 2004 MacNeille et al.
U.S. Pat. No. 7,440,585 B2 October 2008 Roh et al.
2013/077590 February 2015 KATARA et al.

FIELD OF THE DISCLOSURE

The embodiments of the present disclosure relates to autonomous vehicles, and more specifically to novel control and communications technologies for one or more autonomous vehicles.

BACKGROUND TO THE EMBODIMENTS PRESENTED IN THIS DISCLOSURE

Substantially autonomous vehicles are anticipated to revolutionize all facets of transport. Substantially autonomous vehicles will be built and designed to substantially lessen, or even remove, the reliance on a human driver to safely navigate to a particular destination, and will lower capital costs for consumers by reducing car-ownership as a new model of "ride-sharing" and "transport on demand" becomes more prominent. Substantially autonomous vehicles are designed with sensors, artificial intelligence control modules, network functionality, and GPS functionality in a substantially interlinked manner in order to perform all the functions of safe driving that previously required a human operator. The key differences between a substantially autonomous vehicle and a human operator are: faster response times to expected or unexpected events occurring in transit, 100 percent, or substantially close to, 100 percent compliance with road rules and regulations, the ability to safely respond to changes in road conditions (e.g. wet roads), and other measures that decreases the chance for human and non-human occupants of a vehicle to be injured or fatally injured. One predicted use of autonomous vehicles is as a taxi service for persons, animals, or goods and services for commercial usage. The predicted benefits of autonomous vehicles as a taxi service is reduced response times upon a user request, more accurate routes taken to destination, and a safer taxi trip for human and non-human occupants, in that the taxi service patrons do not have to worry about factors such as driver fatigue, abuse of substances by driver, or other "human error" failings that may cause injury or fatal injury.

Attempts in the art to make workable infrastructure for autonomous vehicles as a taxi-service are, for example, embodied by US. Pat. Application 2013077590 by KATARA et al., which describes a novel system for ensuring authentication of users requesting the autonomous vehicle taxi services. The novel system focuses on an "in-vehicle passenger authorization system" and whilst it is comprehensive in the procedures and processes involved with authenticating a user before the user makes active use of the autonomous vehicle taxi service, it fails to consider other important elements and potential scenarios involved with requesting and utilizing an autonomous vehicle taxi service.

Hence there is a need in the art to address such elements, in order to minimize capital costs for owners or operators of the autonomous vehicle taxi-service, maximise efficiencies and energy usage, maximise positive reputation for the owner or operator, and ensure maximum consumer satisfaction to ensure the long-term viability of an autonomous vehicle taxi-service.

SUMMARY OF THE EMBODIMENTS

According to the present disclosure, a technique is disclosed using novel apparatus and methods for interrupting a request for an autonomous vehicle taxi-service to navigate and travel to within the substantially similar geographical location as the input/output device with software comprising the functionality to place a request for an autonomous vehicle tax-service. Specifically, the technique discloses one or more apparatuses and methods for generating an interruption signal to prevent the substantially autonomous vehicle from navigating to within, equal to, or less than a 79.5 to a 80.7 meter radius of said input/output device in any arbitrary or pre-determined direction. In a preferred embodiment, the input/output device is a mobile communications device, such as a smartphone, tablet, PDA, or any similar device that has the functionality to provide mobile, on-demand and wireless communications. In a specific embodiment, the term "interrupting a request for an autonomous vehicle taxi-service" generally means that a data packet is generated by a software program loaded onto an input/output device that is able to generate an initial request for an autonomous vehicle taxi-service, and wherein said data packet contains information signals that effectively interrupts the initial request for autonomous vehicle taxi-service to service the user, and will direct the initially requested autonomous vehicle taxi-service to divert from approaching the substantially similar geographical location as the input/output device comprising software that generated the initial request for autonomous vehicle taxi-service as a direct response to the initial request for autonomous vehicle taxi-service. The present disclosure provides an efficient and safe way to ensure that an autonomous vehicle that is to be used as a taxi service does not waste energy and resources, and cause inefficiencies for other users, by transiting to a pickup-location when it is not required. The present disclosure also provides a crucial element in ensuring that autonomous vehicles are practical under all considerations.

In a preferred embodiment, a process method for listening for user supplied input and processing said user supplied input and recognizing that said user supplied input comprises an effective interruption to the request for an autonomous vehicle taxi-service in the form of an interruption request is provided. The user-supplied input is detected and provided to a decision block, whereupon the decision block recognizes that the user supplied input comprises information directing an immediate interruption to the request for an autonomous vehicle taxi-service in the form of an interruption request. The decision block directs the generation of a transmittable data packet comprising an information signal comprising directions to commence interruption of the initial request for an autonomous vehicle taxi-service to navigate to within, equal to, or less than 79.5 to 80.7 meters of the mobile communications device in any direction. The data packet is transmitted through some medium to the control unit or controller of the initially requested autonomous vehicle. The process method actively listens for a data packet transmitted by the control unit or controller of the autonomous vehicle comprising information signals comprising confirmation of the receiving of, and processing of, the initially sent data packet. The confirmation data packet is received by the decision block, whereupon an output signal to the user is generated on the input/output device confirming interruption of the initial request for an autonomous vehicle for the purposes of a taxi-service. If the confirmation packet returns a negative value indicating that the request was processed and declined by the substantially autonomous vehicle, the user may be notified via the output signal such as a flashing LED light, a text message, a string of alphanumerical values, an audible sound, and the like, that the autonomous vehicle is continuing to navigate to within, equal to, or less than a 79.5 to a 80.7 meter radius of the mobile communications device in any direction. This scenario or outcome may be because the interruption signal data packet was processed by the substantially autonomous vehicle after the substantially autonomous vehicle has navigated to within, equal to, or less than a 79.5 to a 80.7 meter radius of the mobile communications device, and therefore it is not economical for a variety of factors for the substantially autonomous vehicle to process the interruption signal, adhere to the request, and divert to service a different request for a substantially autonomous vehicle taxi-service. Upon receiving the interruption signal request data packet, the substantially autonomous vehicle may perform relative positioning processing to determine the relative distance between the mobile communications device and the substantially autonomous vehicle at the time of reception and/or processing of the interruption signal data packet, or a pre-determined timeframe thereof. Such relative distance determination may be performed to ensure that the substantially autonomous vehicle has not navigated to within, equal to, or less than a 79.5 to 80.7 meter radius of the mobile communications device at the time of reception and/or processing of the interruption signal data packet by the substantially autonomous vehicle, or a pre-determined timeframe thereof. The result of such relative distance determination may be used to determine whether the substantially autonomous vehicle's response to the interruption signal data packet is a confirmation, or a negative value. Such relative distance determination between the substantially autonomous vehicle and the mobile communications device is well known in the art, and may take advantage of techniques such as, but not limited to, aspects of those disclosed in U.S. Pat. No. 6,813,561 B2 by MacNeille et al.

In an alternative embodiment, a process method for listening for user supplied input and processing said user supplied input and recognizing that said user supplied input comprises an effective interruption to the request for an autonomous vehicle taxi-service in the form of an interruption request is provided. In this embodiment, after the autonomous vehicle that received the initial request for taxi-service confirms interruption of the initial request for the autonomous vehicle taxi-service, user input is prompted to provide a future time for an autonomous vehicle taxi-service to approach a substantially similar location to the input/output device loaded with software that is able to transmit the interruption to request for autonomous vehicle taxi-service data packet to the control unit or controller of the initially requested autonomous vehicle for the purposes of a taxi-service. The autonomous vehicle that acts upon this request at the set future time may be the same autonomous vehicle that received the earlier termination request, or may be a different autonomous vehicle.

Advantages of the embodiments of the present disclosure include providing a greater level of control and ease for the user with regards to travelling in a substantially autonomous vehicle. The interrupting and rescheduling of the approach of an autonomous vehicle for the purposes of a taxi-service is equally important to the system and apparatus of ensuring authorised access to an autonomous vehicle by an in-vehicle system as described in US. Pat. Application 2013077590 by KATARA et al. For example, a user may be located some distance away from their autonomous vehicle and may initially request their autonomous vehicle to approach their approximate geographical location for the purposes of a taxi-service. However, prior to the approach of the autonomous vehicle into the substantially similar geographical location as the user, the user may be warned of severe weather and decide to interrupt the request for autonomous vehicle taxi-service until the severe weather has passed in order to ensure that the autonomous vehicle does not suffer needless damages and to ensure the safety of the user. In this use case, the user may opt to reschedule the approach of the autonomous vehicle into the substantially similar geographical location as the user to a future time when the user can be sure that the severe weather has passed. Another strong advantage of the embodiments of the present disclosure is to provide the flexibility of modifying the geographical destination of the request for the autonomous vehicle as a taxi-service in the case of, for example, bodily-disabled users. In one use case, a bodily-disabled user may place an initial request for their autonomous vehicle to approach the substantially similar geographical location as the input/output device that placed the initial request for autonomous vehicle as a taxi-service. At a later stage, after placing the initial request, but before the autonomous vehicle arrives at the substantially similar geographical location as the input/output device that placed the initial request for the autonomous vehicle as a taxi-service, the bodily-disabled user may find a more suitable location to meet the autonomous vehicle as a taxi-service. In this case example, using the embodiments of the present disclosure, the bodily-disabled user has the flexibility to interrupt the initial request for the autonomous vehicle as a taxi-service, via an interruption signal generated by the process methods of the embodiments of the present disclosure, and generate a new request for the autonomous vehicle as a taxi-service at a future point in time using the process methods of the embodiments of the present disclosure. Many other use cases exist, particular the use of autonomous vehicles as a taxi-service in commercial applications, and several non-limiting examples will be detailed in the specification.

For primarily energy conservation reasons, to maximise use of available resources, and to generate a maximum return on investment for owners or operators of a substantially autonomous vehicle taxi-service, most substantially autonomous vehicle taxi-services are required to navigate to within, equal to, or less than a 79.5 to a 80.7 meter radius of the requesting mobile communications device. This maxim holds true for metropolitan and urban areas. In metropolitan areas, where parking may be an issue due to congested roads, the necessity of paying for parking, or the undersupply of appropriate parking spaces compared to the demand, it may be more likely that the substantially autonomous vehicle will navigate to within 79.5 to 80.7 meters of the requesting mobile communications device or a distance value close thereof than in urban areas. However, generally, if a substantially autonomous vehicle navigates to within a distance greater than 79.5 to 80.7 meters of the requesting mobile communications device, the time taken for the requesting user to take advantage of the autonomous vehicle taxi-service may constitute a wastage of resources in terms of the energy consumption of the "idling" substantially autonomous vehicle, as well as the other customers in the servicing queue who may not be serviced as efficiently as possible, leading to poor customer feedback, and hence a poor return on investment or poor revenues for the owner of the substantially autonomous vehicle as customers then shift to competitor substantially autonomous vehicle taxi-service operators and solutions. The substantially autonomous vehicle navigating to within, equal to, or less than a 79.5 to 80.7 meter radius of the requesting mobile communications device is held as the ideal distance-value range to maximise value for the owner of the substantially autonomous vehicle as well as maximise value for the customer, in terms of maximum number of customers served in a certain timeframe or time-value, minimizing energy consumption costs to serve those customers, and generate positive feedback for overall reputation enhancing. Additionally, for similar above-listed reasons, it may be inefficient or not economical to allow an interruption signal request wherein at the time or time-window the interruption signal data packet is processed by the substantially autonomous vehicle, the substantially autonomous vehicle has navigated to within, equal to, or less than a 79.5 to 80.7 meter radius of the requesting mobile communications device. Finally, the transmission and processing of the interruption signal should occur in as short a time as reasonable and possible in order to meet the aims and goals of the embodiments of the present disclosure.

The present disclosure is intended to provide apparatuses and methods to maximise efficiency for the end user of an autonomous vehicle taxi-service and to maximise financial returns and positive reputation for the owner or operator of the autonomous vehicle taxi-service leading to an ideal "win-win" outcome and ensuring the long-term viability of the autonomous vehicle taxi-service.

Further understanding of the nature and advantages of the embodiments of the present disclosure may be realized by reference to the remaining portions of the specification and drawings.

BRIEF DESCRIPTION OF THE DRAWINGS

The concepts described herein are illustrated by way of example and not by way of limitation in the accompanying figures. For simplicity and clarity only the most pertinent aspects and elements to the embodiments of the present disclosure are presented. Where considered appropriate, reference labels have been repeated among the figures to indicate corresponding or analogous elements or aspects.

DESCRIPTION OF THE SPECIFIC EMBODIMENTS

The embodiments of the present disclosure will now be described in reference to preferred and alternative embodiments of systems, apparatuses and methods that operate and facilitate user-inputted interruptions to a request for an autonomous vehicle taxi-service. Specifically, examples will be described which illustrate particular features of the preferred and alternative embodiments of the present disclosure. The embodiments of the present disclosure, however, are not limited to any particular features nor limited by the examples described herein. Therefore, the descriptions of the embodiments that follow are for the purposes of illustration and not limitation.

In the present disclosure, an autonomous vehicle, an autonomous vehicle taxi-service, or a substantially autonomous vehicle, or a substantially autonomous vehicle taxi-service refers to a substantially self-driving car, truck, bus, motorcycle, boat or other vehicle that allows for the ferrying or transport of a single or plurality of human and/or non-human occupants, including commercial goods, products and services, or some combination thereof, from a first geographical location to a second geographical location over an arbitrary or pre-determined time frame, time, or time-window. An autonomous vehicle refers to Level 3, Level 4, or Level 5 classification of autonomous vehicle as defined by the SAE International Standard J3016, with an emphasis on Level 4 and Level 5 autonomous vehicles, wherein Level 5 autonomous vehicles or substantially autonomous vehicles refers to a class of autonomous vehicle that does not require human intervention to operate. Hence, the autonomous vehicle may be partially or fully independent of active human intervention.

In the present disclosure, an autonomous vehicle taxi-service or a substantially autonomous vehicle taxi-service may also be defined, where appropriate, as an autonomous vehicle ride-sharing service for human, non-human occupants, commercial goods, products and services, or some combination thereof, or a substantially autonomous vehicle ride-sharing service for human, non-human occupants, commercial goods, products and services, or some combination thereof.

In the present disclosure, a user input/output device may comprise, and is interchangeable with, a mobile communications device, such as a smartphone, Blackberry, and the like, a smart-watch, a smart device, a paging device, a PDA, a "wearable" device, an "Internet of Things" device, a two way radio, a notebook computer, a tablet, phablet, a plurality of networked communications devices, or any derivative thereof, or an electronics device capable of connecting to a wireless communications network or a telecommunications network. Each of these devices may be classified as a computer.

In the present disclosure, all applicable software programs and modules are stored as computer or controller-readable programming instructions, programmatic instructions, or code on one or more non-transient computer-readable storage mediums. Computer-readable media includes both computer storage media and communications media including any medium that facilitates the transfer of a software program or module from one place to another. A storage media may be any available media that can be accessed by a computer. By way of example, and not limitation, such computer-readable media can comprise RAM, ROM, EEPROM, CD-ROM, solid-state drive, USB-compatible device, or other optical disk storage, magnetic disk storage, or other magnetic storage devices, or any other medium that can be used to carry or store desired program code in the form of instructions or data structures that can be accessed by mobile communication device, substantially autonomous vehicle, or other user input/output device controllers. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. Cloud or remote based storage systems are also to be considered within the scope of computer-readable media. Those with skill in the art will readily recognize additional computer-readable storage mediums that fall within the scope of the present disclosure.

In the present disclosure, all programmatic computer instructions comprising software modules and software programs are preferably executed by one or more appropriate controllers, as necessary, on the mobile communications device, or other user input/output device, and on the substantially autonomous vehicle. The controller may comprise one or more processors, microcontrollers, microprocessors, digital signal processors, analogue processors, field programmable gate array processors, and the like. Those with skill in the art will readily recognize additional controllers that fall within the scope of the present disclosure.

Figure 1:
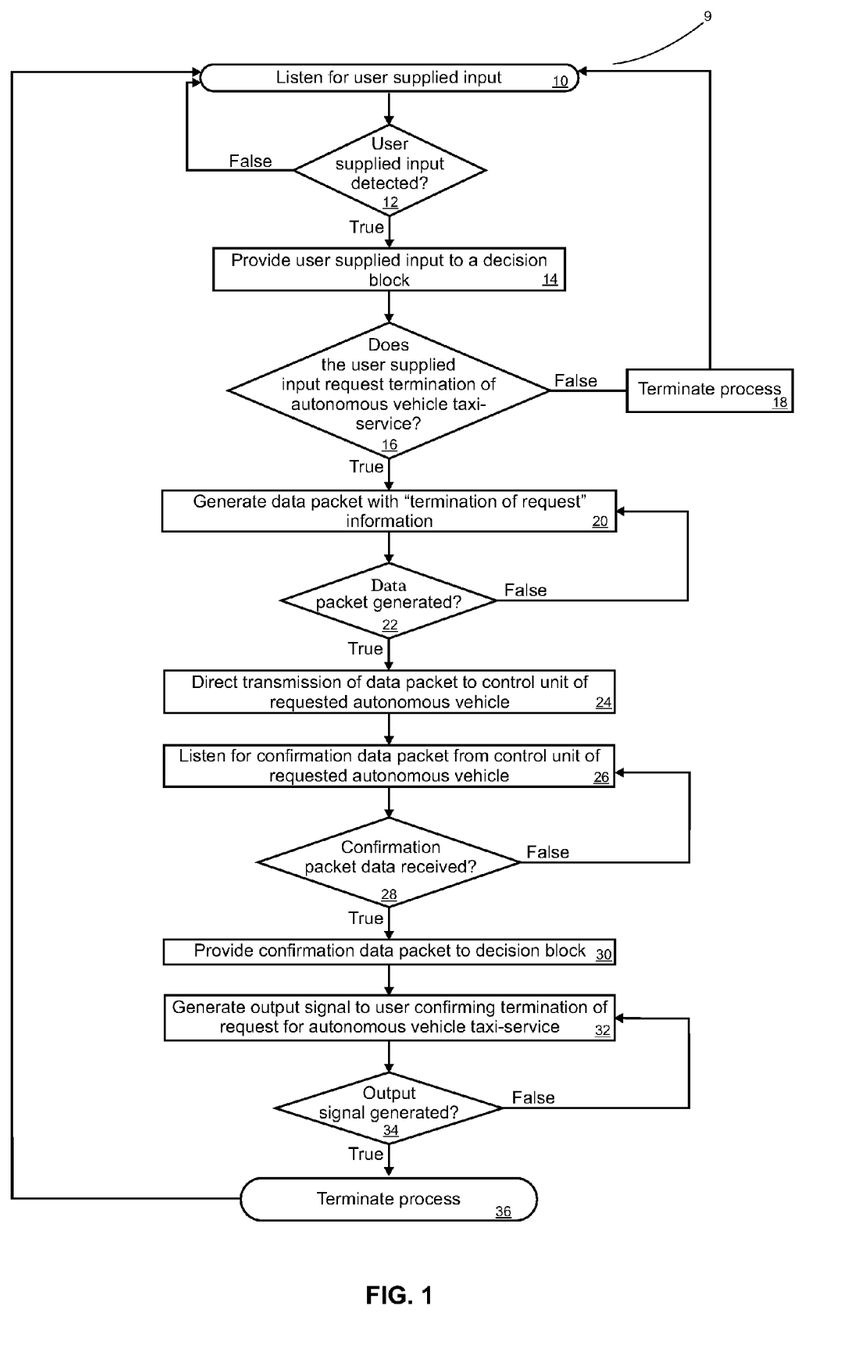
FIG. 1 is a simplified block diagram of a preferred embodiment of a user controlled interruption to a request for an autonomous vehicle to navigate to within, equal to, or less than 79.5 to 80.7 meters of the requesting mobile communications device.

FIG. 1 is a simplified exemplary flow diagram of a process method 9 of enabling for the interruption of a request for an autonomous vehicle taxi-service in accordance with a preferred embodiment of the present disclosure. In a step 10, a software module substantially coupled to a user input/output device listens for user supplied input. At arbitrary, or pre-determined, points in time, a step 12 makes a determination of the presence or recording of user supplied input. If the step 12 returns TRUE on the supply of user input, a step 14 provides user supplied input to a decision block. If the step 12 returns FALSE, the process method may return to the step 10. In a step 16, a determination is made as to whether the user-supplied input comprises an instruction to interrupt an initially placed request for an autonomous vehicle taxi-service. If the step 16 returns FALSE, a step 18 is executed that terminates the currently running process method and generates a new process method at 10. In some instances, the process method 9 may terminate without returning or generating a new process method at step 10. If the step 16 returns TRUE, a step 20 generates a transmissible data packet comprising an information signal comprising an instruction to interrupt a request for the autonomous vehicle taxi-service. A step 22 determines if the transmissible data packet comprising an information signal comprising an instruction to interrupt a request for the autonomous vehicle taxi-service has been effectively generated. If the step 22 returns FALSE, the process method 9 returns to the step 20. If the step 22 returns TRUE, a step 24 directs transmission of the data packet comprising an information signal comprising an instruction to interrupt a request for the autonomous vehicle taxi-service to a control unit or controller of the requested autonomous vehicle for taxi-service (i.e. an interruption signal). At the step 24, the transmission of the data packet may involve generating a first electromagnetic signal and a second electromagnetic signal and modulating the data packet into controller-readable and reconstructable aspects of the first electromagnetic signal and the second electromagnetic signal. Exact copies of the data packet may additionally be generated and transmitted in order to account for, and overcome, losses such as atmospheric absorption, multi-path fading, and the like, as those with skill in the art will readily understand. The first electromagnetic signal and the second electromagnetic signal may be any appropriate radio wave or microwave. It is imperative that the data packet retains its structural integrity whilst being transmitted through the atmospheric medium between the mobile communications device and the substantially autonomous vehicle. It may be desirable if copies of the data packet are not needed to reconstruct the interruption signal at the receiving antenna and/or controller of the substantially autonomous vehicle, as sending an interruption signal efficiently and quickly is critical in order to satisfy consumer demands and to reroute the substantially autonomous vehicle to service other consumers as efficiently as possible in order to minimize costs, maximise revenues, and ensure positive or continued positive reputation of the substantially autonomous vehicle taxi-service owner or operator. Copies of the interruption signal may involve additional time lapsing. Hence, in line with this, it may be desirable for the first electromagnetic signal and the second electromagnetic signal to be captured as a unified waveform by the receiving antenna coupled to the substantially autonomous vehicle. Hence, at at least one point along the transmission path, it is desirable if the first electromagnetic signal and the second electromagnetic signal are unified to ensure the structural integrity and readability, with minimal error, of the data packet comprising the interruption signal and where unification may occur at at least a point along the transmission path equal to or greater than 79.5 to 80.7 meters from the mobile communications device in order to remain in accordance with the aims and goals of the present disclosure. The aims and goals of the present disclosure are in maximising resources, revenues and efficiencies for the owner or operator of the substantially autonomous vehicle and the end consumer, and minimizing costs for the owner or operator of the substantially autonomous vehicle and the end consumer by ensuring that an interruption signal data packet is effective wherein the substantially autonomous vehicle is equal to or greater than 79.5 to 80.7 meters from the mobile communications device. Hence, the at least one point may be substantially the near field of the receiving antenna coupled to the substantially autonomous vehicle. A step 26 listens for a confirmation data packet originating from the control unit or controller of the requested autonomous vehicle for taxi-service. At arbitrary, or pre-determined, points in time, a step 28 makes a determination of the presence of a confirmation data packet originating from the control unit or controller of the autonomous vehicle taxi-service that previously received a request for the autonomous vehicle taxi-service. If the step 28 returns FALSE, the process method 9 returns to the step 26 and this may loop through iteratively for a pre-determined number of iterations or a pre-determined time-frame, time-window or time-value. Preferably, in order to remain within the aims of the present disclosure, the step 28 is executed frequently. If the step 28 returns TRUE, a step 30 provides the confirmation data packet originating from the control unit or controller of autonomous vehicle taxi-service that previously received a request for autonomous vehicle taxi-service to the decision block. A step 32 generates an output signal to the user confirming the termination of the request for autonomous vehicle taxi-service. A step 34 detects if the output signal has been generated. If the step 34 returns FALSE, the process method 9 returns to the step 32 and this iterative process may occur for a pre-determined number of times or a pre-determined time-frame, time-window, or time-value. If the process method 34 returns TRUE, a step 36 terminates the process method 9 and a new process 9 is generated starting from the step 10. In some instances, the step 28 may terminate and terminate the process method 9 if a pre-determined amount of time has lapsed and a confirmation data packet has not been received. This is in order to conserve resources and to ensure that the end user of the mobile communications device can be informed as to whether the interruption signal has been successfully processed and affirmed by the substantially autonomous vehicle. A failure to receive a confirmation data packet at the step 28 after a pre-determined time-window has lapsed may indicate that the interruption signal data packet was not successfully processed and affirmed by the substantially autonomous vehicle, meaning the substantially autonomous vehicle is still set to arrive at the originally requested location at the originally requested time or time-window. This may be because the interruption signal data packet was not successfully processed by the substantially autonomous vehicle due to errors in transmission via the wireless communications network, due to errors in the circuitry or software of the mobile communications device and/or the substantially autonomous vehicle, and the like. In accordance with the spirit and aims of the present disclosure, another equally viable reason is at the time the interruption signal data packet was processed by the appropriate controller on the substantially autonomous vehicle, the substantially autonomous vehicle had already navigated to within, or was otherwise located within, less than, or equal to 79.5 to 80.7 meters of the mobile communications device that generated and transmitted the interruption signal data packet. In this case scenario, it may be uneconomical for the substantially autonomous vehicle to affirm the interruption signal data packet and relocate to service a different consumer. This is due to the travel time and associated cost taken to navigate to the user of the mobile communications device, which may cause a capital loss to the owner or operator of the substantially autonomous vehicle as compared to the time not servicing a customer. In other instances, the confirmation data packet received at the step 28 may comprise a negative confirmation, wherein the user of the mobile communications device is subsequently notified via the output signal generated at the step 32 that the interruption signal request was denied or unsuccessfully processed by the substantially autonomous vehicle. Those with skill in the art will readily recognize that any of the steps in the process method 9 may be executed substantially simultaneously, or may be omitted, rearranged into a different order, have parameters varied, may be executed iteratively, reiteratively, or a plurality of times, and the like, or may be executed by a plurality of processors or a plurality of software modules, without departing from the spirit and scope of the present disclosure.

In the above preferred embodiment, determination of user supplied input of the termination of the request for autonomous vehicle taxi-service may be facilitated by means of any visual, graphical, audio, tactile, or other user interface that may accurately process and record user input and wherein said means is facilitated by the user input/output device loaded with the appropriate software module of the present disclosure.

In the above preferred embodiment, determination of the generation of a transmissible data packet containing the termination request interruption signal may be made by comparing the generated data packet to a template data packet coupled to the software module controlling the process method of the above embodiment, wherein this data packet contains an information signal comprising an instruction to interrupt a request for an autonomous vehicle taxi-service. Alternatively, determination of the generation of a transmissible data packet may be made by comparing the size (in a standard such as "bytes") increase of the total memory allocated to the software module controlling the process method of the above embodiment after the step 20 is executed and determining if the difference in total memory sizes prior and after the step 20 is executed is aligned with the memory increase that the generated transmissible data packet comprising the termination request would induce. Other applicable processes and steps will be readily understood by those with skill in the art.

As has been stated above and reiterated here, in the above preferred embodiment, the interruption signal comprises a first electromagnetic signal and a second electromagnetic signal extant at at least one aspect of a wireless communications network used to transmit the interruption signal to the substantially autonomous vehicle, and wherein the at least one aspect may be the near-field of a receiving antenna coupled to the substantially autonomous vehicle operable to absorb the electromagnetic waveform. Furthermore, the first electromagnetic signal and the second electromagnetic signal are substantially unified in an aspect of the near-field of the receiving antenna to assist the non-corruptness of the data packet and wherein the unification occurs at a point greater than, or equal to, the 79.5 to 80.7 meter radius from the mobile communications device. It is essential that the interruption signal generated and received according to the preferred embodiment retains its informational integrity to as great an extent as possible, in order to maximise efficiencies and minimize time costs according to the aims and desired outcomes of the present disclosure.

In the above preferred embodiment, transmission of generated data packet to the control unit or controller of the requested autonomous vehicle taxi-service, as executed by the step 24 may be facilitated by any recognized transmission method and apparatus for communications. In most embodiments, the transmission is facilitated by a standard, and preferably secure, wireless communication protocol such as 802.11x, Zigbee, Bluetooth, cellular network, satellite network, mobile telecommunications network, and the like.

In the above preferred embodiment, the output signal that is generated at the step 32 may be any visual, graphical, audio, text, tactile, motion signal, or software algorithm that is sufficient to provide an output signal at an input/output device loaded with the appropriate software module executing the process method of the present embodiment and disclosure.

As has been stated above, in a non-limiting example the interruption signal generated by process method 9 may be rejected prior to being processed by the control unit or controller of the initially requested autonomous vehicle as a taxi-service where the geographical location of the initially requested autonomous vehicle as a taxi-service is less than, equal to, or within a pre-determined distance margin of 79.5 to 80.7 meters from the geographical location of the mobile communications device loaded with the software module of the present disclosure. In such a case, the confirmation data packet generated by the autonomous vehicle taxi-service returns negative, and the output signal generated at step 32 indicates that the interruption signal generated by the mobile communications device return has been declined. To accurately determine whether the autonomous vehicle taxi-service is less than, equal to, or within a pre-determined distance margin of 79.5 to 80.7 meters, the autonomous vehicle taxi-service or the mobile communications device may perform one or more relative distance calculations or determinations between the mobile communications device and the autonomous vehicle taxi-service. Such relative distance calculation or determination techniques and methods are well known in the art and will not be further discussed here. A non-limiting example of such techniques and technologies, or aspects thereof, is described in U.S. Pat. No. 6,813,561 B2 by MacNeille et al. Those with skill in the art will readily recognize further applicable techniques and technologies.

The above preferred embodiment may be equally applicable wherein a plurality of autonomous vehicle taxi-services have been requested by the mobile communications device, and the interruption signal is to be sent to one or more of the plurality of autonomous vehicle taxi-services to interrupt the request for the one or more autonomous vehicle taxi-services to navigate to within, equal to, or less than 79.5 to 80.7 meters of the requesting mobile communications device.

Figure 2:
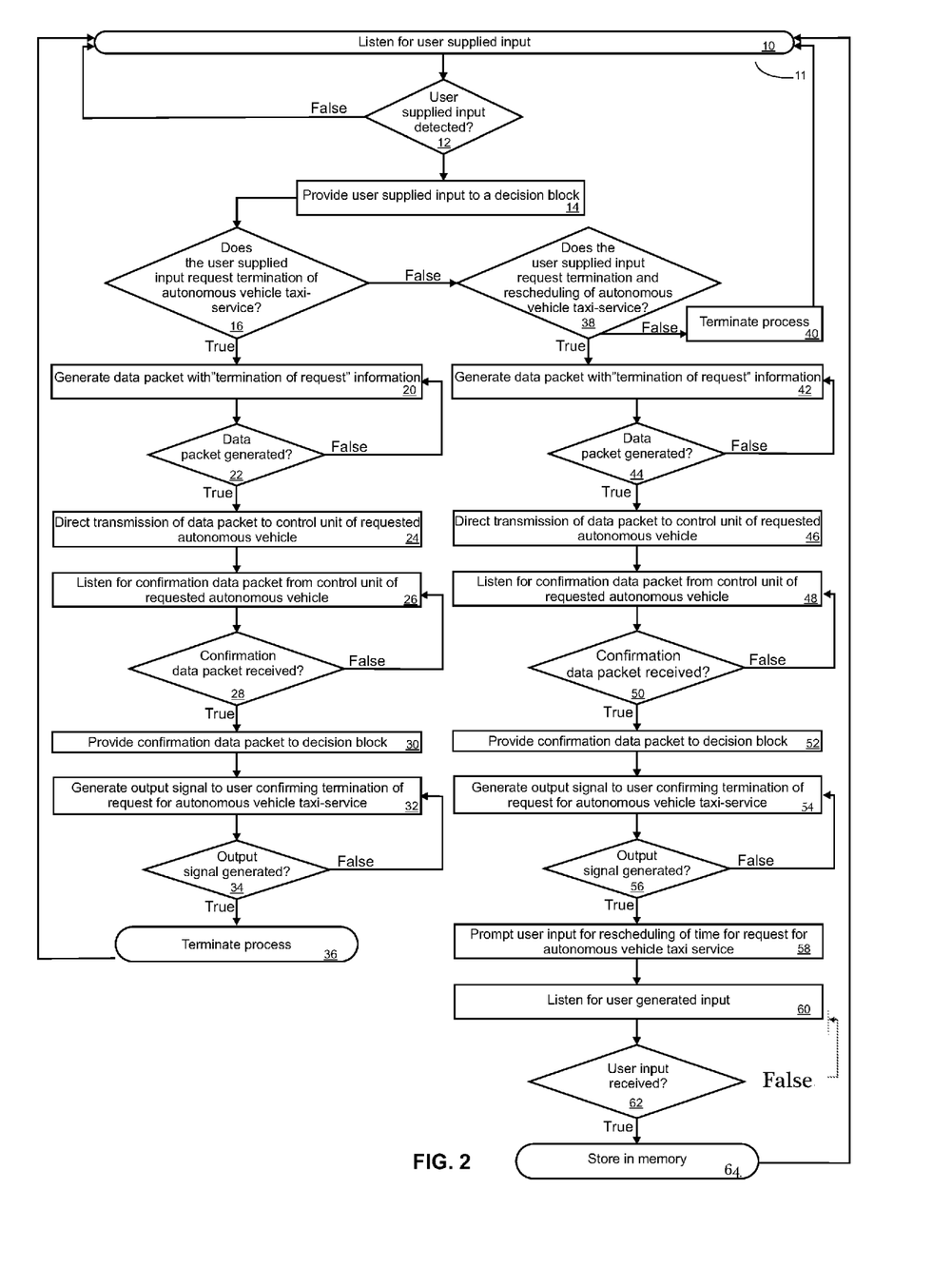
FIG. 2 is a simplified block diagram of an embodiment of a user controlled interruption to a request for an autonomous vehicle to navigate to within, equal to, or less than 79.5 to 80.7 meters of the requesting mobile communications device followed by a subsequent rescheduling of the request for an autonomous vehicle taxi-service to a future point in time.

FIG. 2 is a simplified flow diagram of a process method 11 enabling for the interruption of a request for an autonomous vehicle taxi-service and a subsequent rescheduling of the request for an autonomous vehicle taxi-service at a future point in time in accordance with an alternative embodiment of the present disclosure. In a step 10, a software module substantially coupled to a user input/output device listens for user supplied input. At arbitrary, or pre-determined, points in time, a step 12 makes a determination of the presence of user supplied input. Such arbitrary or pre-determined times are preferably frequent in order to maximise efficiency in accordance with the aims and goals of the present disclosure. If the step 12 returns TRUE on the supply of user input, a step 14 provides user supplied input to a decision block. If the step 12 returns FALSE, the process method 11 may return to the step 10 and this process may iterate through a pre-determined number of logical cycles or for a pre-determined time-frame, time-window, or time-value. In a step 16, a determination is made as to whether the user-supplied input comprises an instruction to interrupt an initially placed request for an autonomous vehicle taxi-service. If the step 16 returns TRUE, a step 20 generates a transmissible data packet comprising an information signal comprising an instruction to interrupt a request for the autonomous vehicle taxi-service. A step 22 determines if the transmissible data packet comprising an information signal comprising an instruction to interrupt a request for the autonomous vehicle taxi-service has been effectively generated. If the step 22 returns FALSE, the process method 11 returns to the step 20 and this may iterate for a pre-determined number of logical cycles or for a pre-determined time-frame, time-window, or time-value. If the step 22 returns TRUE, a step 24 directs transmission of data packet comprising an information signal comprising an instruction to interrupt a request for the autonomous vehicle taxi-service to a control unit or controller of the requested autonomous vehicle for taxi-service. A step 26 listens for a confirmation data packet originating from the control unit or controller of the requested autonomous vehicle for taxi-service. At arbitrary or pre-determined points in time, which are preferably frequent, a step 28 makes a determination of the presence of a confirmation data packet originating from the control unit or controller of the autonomous vehicle taxi-service that previously received a request for the autonomous vehicle taxi-service. If the step 28 returns FALSE, the process method 9 returns to the step 26 and this may iterate for a pre-determined number of logical cycles or for a pre-determined time-frame, time-window, or time-value. If the step 28 returns TRUE, a step 30 provides the confirmation data packet originating from the control unit or controller of the autonomous vehicle taxi-service that previously received a request for the autonomous vehicle taxi-service to the decision block. A step 32 generates an output signal to the user confirming the termination of the request for the autonomous vehicle taxi-service. A step 34 detects if the output signal has been generated. If the step 34 returns FALSE, the process method 9 returns to the step 32 and this may iterate for a pre-determined for a pre-determined number of logical cycles or for a pre-determined time-frame, time-window, or time-value. If the process method 34 returns TRUE, a step 36 terminates the process method 11 and a new process method 11 is generated starting from the step 10. In some instances, the step 36 may execute but the process method 11 may not return to the step 10 in order to conserve memory, processor and energy resources or as the context requires. If the step 16 returns FALSE, a step 38 determines if the user supplied input requests interruption of the present request for the autonomous vehicle taxi-service, and subsequent rescheduling at a future point in time of a request for the autonomous vehicle taxi-service. If the step 38 returns FALSE, a step 40 terminates the process method 11 and generates a new process method 11 from the step 10. In some cases, the execution of the step 40 may not then subsequently result in a new process method 11 being generated at the step 10 in order to conserve memory, processor and energy resources and as the context requires. If the step 38 returns TRUE, a step 42 generates a transmissible data packet comprising an information signal comprising an instruction to interrupt a request for the autonomous vehicle taxi-service. A step 44 determines if the transmissible data packet comprising an information signal comprising an instruction to interrupt a request for the autonomous vehicle taxi-service has been effectively generated. If the step 44 returns FALSE, the process method 11 returns to the step 42 and this may iterate for a pre-determined number of cycles or for a pre-determined time-frame, time-window, or time-value. If the step 44 returns TRUE, a step 46 directs transmission of the data packet comprising an information signal comprising an instruction to interrupt a request for autonomous vehicle taxi-service to a control unit or controller of the requested autonomous vehicle for taxi-service. A step 48 listens for a confirmation data packet originating from the control unit or controller of the requested autonomous vehicle for taxi-service. At arbitrary or pre-determined points in time, which are preferably frequent, a step 50 makes a determination of the presence of a confirmation data packet originating from the control unit or controller of the autonomous vehicle taxi-service that previously received a request for the autonomous vehicle taxi-service. If the step 50 returns FALSE, the process method 11 returns to the step 48 and this may iterate through for a pre-determined number of logical cycles or a pre-determined time-frame, time-window, or time-value. If the step 50 returns TRUE, a step 52 provides the confirmation data packet originating from the control unit or controller of the autonomous vehicle taxi-service that previously received a request for the autonomous vehicle taxi-service to the decision block. A step 54 generates an output signal to the user confirming the interruption of the request for the autonomous vehicle taxi-service. A step 56 detects if the output signal has been generated. If the step 56 returns FALSE, the process method 11 returns to the step 54 and this may iterate for a pre-determined number of logical cycles or for a pre-determined time-frame, time-window, or time-value. If the step 56 returns TRUE, a step 58 prompts for user supplied input for the future point in time at which rescheduling of the request for the autonomous vehicle taxi-service is to be executed. A step 60 listens for user-supplied input comprising a future point in time at which rescheduling of the request for autonomous vehicle taxi-service is to be executed. At arbitrary or pre-determined points in time, which are preferably frequent, a step 62 determines if user supplied input has been received. If the step 62 returns FALSE, the process method 11 returns to the step 60 and this may iterate for a pre-determined number of logical cycles or a pre-determined time-frame, time-window, or time-value. If the step 62 returns TRUE, a step 64 involves the user supplied input comprising a future point in time at which rescheduling of the request for the autonomous vehicle taxi-service is to be executed being stored in a computer-readable memory storage medium coupled to the software module executing this process method 11 and then terminates the process method 11 and generates a new process method 11 at the step 10. Those with skill in the art will readily recognize that any of the steps in the process method 11 may be executed substantially simultaneously, or may be omitted, rearranged into a different order, have parameters varied, may be executed iteratively, reiteratively, or a plurality of times, and the like, or may be executed by a plurality of processors or a plurality of software modules, without departing from the spirit and scope of the present disclosure.

In the above embodiment, the interruption signal generated and transmitted at the step 24 or the step 46 comprises a first electromagnetic signal and a second electromagnetic signal extant at at least one aspect of a wireless communications network used to transmit the interruption signal to the substantially autonomous vehicle, and where the at least one aspect may be the near-field of a receiving antenna coupled to the substantially autonomous vehicle operable to absorb the electromagnetic waveform. Furthermore, the first electromagnetic signal and the second electromagnetic signal are substantially unified in an aspect of the near-field of the receiving antenna to assist the non-corruptness of the data packet and where the unification occurs at a point greater than, or equal to, the 79.5 to 80.7 meter radius from the mobile communications device. It is essential that the interruption signal generated and received according to the preferred embodiment retains its informational integrity to as great an extent as possible, in order to maximise efficiencies according to the aims and desired outcomes of the present disclosure. To combat other wireless communication network sources of error, such as atmospheric absorption or multi-path fading, and the like, multiple exact copies of the interruption signal data packets may be generated and transmitted at the step 24 or the step 46. However, it may be desirable if the multiple exact copies are not needed, due to the extra time required, and the original interruption signal data packet can retain its structural and data integrity in order for the controller coupled to the substantially autonomous vehicle to efficiently process it and transmit a confirmation data packet at the step 28 or the step 50.

In the above embodiment, transmission of generated data packet to the control unit of the requested autonomous vehicle taxi-service, as executed by the step 24 or the step 46 may be facilitated by any recognized transmission method and apparatus for communications. In most embodiments, the transmission is facilitated by a standard, and preferably secure, wireless communication protocol such as 802.11x, Zigbee, Bluetooth, cellular network, satellite network, mobile telecommunications network, and the like.

In the above embodiment, the output signal that is generated at the step 32 or the step 54 may be any visual, graphical, audio, text, tactile, motion signal, or software algorithm that is sufficient to provide an output at an input/output device loaded with the appropriate software module executing the process method of the present embodiment and disclosure.

In a non-limiting example the interruption signal generated by process method 11 may be rejected prior to being processed by the control unit or controller of the initially requested autonomous vehicle as a taxi-service where the geographical location of the initially requested autonomous vehicle as a taxi-service is less than, equal to, or within a pre-determined distance margin of 79.5 to 80.7 meters from the geographical location of the mobile communications device loaded with the appropriate software module of the present disclosure. In such a case, the confirmation data packet generated by the autonomous vehicle taxi-service returns negative, and the output signal generated at step 32 or step 54 indicates that the interruption signal generated by the mobile communications device return has been declined. To accurately determine whether the autonomous vehicle taxi-service is less than, equal to, or within a pre-determined distance margin of 79.5 to 80.7 meters, the autonomous vehicle taxi-service or the mobile communications device may perform one or more relative distance calculations or determinations between the mobile communications device and the autonomous vehicle taxi-service. Such relative distance calculation or determination techniques and methods are well known in the art and will not be further discussed here. A non-limiting example of such techniques and technologies, or aspects thereof, is described in U.S. Pat. No. 6,813,561 B2 by MacNeille et al. Those with skill in the art will readily recognize further applicable techniques and technologies.

In the above embodiment, determination of user supplied input of a future point in time in which to reschedule the execution of the request for autonomous vehicle taxi-service may be facilitated by means of any visual, graphical, audio, tactile, or other user interface that may accurately process and record user input and where said means is facilitated by the input/output device loaded with the appropriate software module of the present disclosure.

The above preferred embodiment may be equally applicable wherein a plurality of autonomous vehicle taxi-services have been requested by the mobile communications device, and the interruption signal and subsequent rescheduling is to be sent to one or more of the plurality of autonomous vehicle taxi-services to interrupt the request for the one or more autonomous vehicle taxi-services from navigating to within, equal to, or less than 79.5 to 80.7 meters of the requesting mobile communications device and reschedule the one or more autonomous vehicle taxi-services to navigate to within, equal to, or less than 79.5 to 80.7 meters of the requesting mobile communications device at a future pre-determined point in time.

Advantages of the present embodiments in the present disclosure include providing a greater level of control and ease for the user with regards to travelling in a substantially autonomous vehicle. The interrupting and rescheduling of the approach of an autonomous vehicle for the purposes of a taxi-service is equally important to the system and apparatus of ensuring authorised access to an autonomous vehicle by an in-vehicle system as described in US. Pat. Application 2013077590 by KATARA et al. For example, a user may be located some distance away from their autonomous vehicle and may initially request their autonomous vehicle to approach their geographical location for the purposes of a taxi-service. However, prior to the approach of the autonomous vehicle into substantially similar geographical location as the user, the user may be warned of severe weather and decide to interrupt the request for the autonomous vehicle taxi-service until the severe weather has passed in order to ensure that the autonomous vehicle does not suffer needless damages and to ensure the safety of the user. In this use case, the user may opt to reschedule the approach of the autonomous vehicle into substantially similar geographical location as the user to a future time when the user can be sure that the severe weather has passed. Another strong advantage of the present disclosure is to provide the flexibility of modifying the geographical destination of the request for the autonomous vehicle as a taxi-service in the case of, for example, bodily-disabled users. In one use case, a bodily-disabled user may place an initial request for their autonomous vehicle to approach substantially similar geographical location as the input/output device that placed the initial request for the autonomous vehicle as a taxi-service. At a later stage, after placing the initial request, but before the autonomous vehicle arrives at the substantially similar geographical location as the input/output device that placed the initial request for the autonomous vehicle as a taxi-service, the bodily-disabled user may find a more suitable location to meet or hail the autonomous vehicle as a taxi-service. In this case example, using the embodiments of the present disclosure, the bodily-disabled user has the flexibility to interrupt the initial request for the autonomous vehicle as a taxi-service, via an interruption signal generated by the process methods of the present disclosure, and generate a new request for the autonomous vehicle as a taxi-service at a future point in time using the process methods of the present disclosure. Many other use cases exist, particular the use of autonomous vehicles as a taxi-service in commercial applications, and several non-limiting examples will be detailed in the specification.

For primarily energy conservation reasons, to maximise use of available resources, and to generate a maximum return on investment, most substantially autonomous vehicle taxi-services are required to navigate to within, equal to, or less than a 79.5 to 80.7 meter radius of the requesting mobile communications device. This maxim holds true for metropolitan and urban areas. In metropolitan areas, where parking may be an issue due to congested roads, the necessity of paying for parking, or the under-supply of appropriate parking spaces compared to the demand, it may be more likely that the substantially autonomous vehicle will navigate to close to within the parameters of 79.5 to 80.7 meters of the requesting mobile communications device or a distance value close thereof than in urban areas where the distance margin of the requesting mobile communications device that the substantially autonomous vehicle can navigate to within may be substantially greater and closer to the zero meter mark than in metropolitan areas. However, generally, if a substantially autonomous vehicle navigates to within a distance greater than 79.5 to 80.7 meters of the requesting mobile communications device, the time taken for the requesting user to take advantage of the autonomous vehicle taxi-service may constitute a wastage of resources in terms of the energy consumption of the "idling" substantially autonomous vehicle, and/or other customers in the servicing queue who may not be serviced as efficiently as possible leading to poor customer feedback, and hence a poor return on investment or poor revenues for the owner of the substantially autonomous vehicle, which may subsequently lead to a loss of a valuable customer base to competitor solutions and operations. The substantially autonomous vehicle navigating to within, equal to, or less than a 79.5 to 80.7 meter radius of the requesting mobile communications device is held as the ideal distance-value range to maximise value for the owner of the substantially autonomous vehicle, in terms of maximum number of customers served within a certain time-frame, minimizing energy consumption costs to serve those customers, creating maximum customer satisfaction and generate positive feedback for reputation enhancement. Additionally, for similar above-listed reasons, it may be inefficient or not economical to allow an interruption signal request wherein at the time or time-window the interruption signal data packet is processed by the substantially autonomous vehicle, the substantially autonomous vehicle has navigated to within, equal to, or less than a 79.5 to 80.7 meter radius of the requesting mobile communications device, or will be navigating to within, equal to, or less than a 79.5 to 80.7 meter distance of the requesting mobile communications device within a certain pre-determined time-window or time-frame or time-value. Finally, the transmission and processing of the interruption signal should occur in as short a time as reasonable and possible in order to meet the aims and goals of the embodiments of the present disclosure.

The embodiments presented in the present disclosure has the advantages of ensuring that a user is able to take full advantage of the unique benefits offered by autonomous vehicles. The present disclosure, by providing a means to generate and transmit an interruption signal to an active request for an autonomous vehicle as a taxi-service, serves as an important foundation to ensure that autonomous vehicles are energy efficient by conserving energy, and are able to effectively serve the plurality and vastly varied requirements generated or needed by users. The present disclosure assists in ensuring that autonomous vehicles are practical in personal and commercial use.

Further, in a non-limiting example, a user may accidentally place a request for an autonomous vehicle as a taxi-service. The present disclosure provides a means for effectively interrupting this request prior to the requested autonomous vehicle as a taxi-service arriving at substantially the same geographical location as the input/output device loaded with the software module of the present disclosure. This is a further advantage, thereof.

Those of skill in the art would understand that control information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, and controlled by computer software, or combinations of both. To clearly illustrate this inter-changeability of hardware and software, various illustrative components, blocks, modules, circuits, and steps have been described above generally in terms of their functionality. Whether such functionality is implemented and controlled as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the disclosure.

The various illustrative logical blocks, modules, and circuits described in connection with the embodiments disclosed herein may be controlled with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The control steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the control functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While every effort has been made to adequately describe the embodiments to which the present disclosure can be applied, those skilled in the art will appreciate that further embodiments may exist to which the present disclosure can be applied congruently and without departing from the spirit of this disclosure.

While the present disclosure has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the disclosure in its broader aspects is not limited to the specific details, representative apparatus and methods, and illustrative examples shown and described. Accordingly, departures may be made from such details without departure from the spirit or scope of the Applicant's general inventive concept.

What is claimed:

1. A system for generating an interruption signal to interrupt a request for ride-sharing service from a substantially autonomous vehicle, the system operable to cause the generation of the interruption signal such that the interruption signal is not corrupted, comprising:
   a mobile communications device operable to receive a first user input;
   a first software module coupled to the mobile communications device;
   the first software module operable to process said first user input and cause the generation of a first data packet;
   said first data packet including a first interruption signal operable to be read by a microprocessor coupled or communicatively coupled to the substantially autonomous vehicle, wherein the interruption signal is an instruction to interrupt the requirement for said substantially autonomous vehicle to navigate to one of within, equal to, or less than a 79.5 to 80.7 meter radius of the mobile communications device;
   said first software module is further operable to cause the processing at the one of the mobile communications device or a networked communications device of an aspect of the interruption signal into at least one of a first electromagnetic signal and a second electromagnetic signal and to cause the transmission of the first electromagnetic signal and the second electromagnetic signal from one of the mobile communications device or the networked communications device;
   the caused transmission of the first electromagnetic signal and the second electromagnetic signal is executed such that the first electromagnetic signal and the second electromagnetic signal are extant at at least a first aspect of a wireless communications network used to transmit the interruption signal to the substantially autonomous vehicle, the at least the first aspect including a near-field of a first antenna operable to absorb an electromagnetic signal or within the near-field of the first antenna;
   wherein the first antenna is operable to directly communicate or indirectly communicate with the microprocessor via a communications channel; and
   the caused transmission of the first electromagnetic signal and the second electromagnetic signal further includes causing the first electromagnetic signal and the second electromagnetic signal to be unified via an interference pattern at a locational point at one of the near-field of the first antenna or within the near-field of the first antenna such that the interruption signal is not corrupted, and wherein the locational point is at least greater than, or equal to, a 79.5 to 80.7 meter radius from the mobile communications device.

2. The system of claim 1, further comprising:

said first software module operable to listens for a confirmation data packet generated by a second software module coupled to said microprocessor coupled to the substantially autonomous vehicle; and said first software module processes said confirmation data packet generated by said second software module coupled to said microprocessor coupled to the substantially autonomous vehicle and in response generates a human-interpretable output signal at the mobile communications device.

3. The system of claim 1, further comprising:

said first software module is is operable to perform at a first instance in time a positional tracking measurement process to track a relative distance between the mobile communications device and the substantially autonomous vehicle in at least a first direction, wherein the positional tracking measurement process includes the steps of:

(i) requesting an at least two unique data points from a 3D space positional tracking system, wherein a first unique positional data point references the position in 3D space of the substantially autonomous vehicle at an instantaneous point in time and the second unique positional data point references the position in 3D space of the mobile communications device at the instantaneous point in time;

(ii) processing the at least two unique positional data points;

(iii) determining the distance between the at least two unique data points; and wherein the positional tracking measurement process further includes the step of generating the first information signal consisting of the first interruption signal if the first software module determines the result of the positional tracking measurement process indicates the relative distance between the mobile communications device and the substantially autonomous vehicle is greater than 79.5 to 80.7 meters in at least the first direction.

4. The system of claim 1, wherein the interruption signal is transmitted via at least the first electromagnetic signal and the second electromagnetic signal to a plurality of substantially autonomous vehicles.

* * * * *